United States Patent [19]

Flucher et al.

[11] Patent Number: 4,557,826
[45] Date of Patent: Dec. 10, 1985

[54] METHOD OF AND APPARATUS FOR SEPARATING TACKY CONTAMINANTS FROM A STOCK SUSPENSION

[75] Inventors: Wolfgang Flucher, Balsthal, Switzerland; Wolfgang Siewert, Ravensburg-Weingartshof, Fed. Rep. of Germany

[73] Assignee: Escher Wyss GmbH, Ravensburg/Württ., Fed. Rep. of Germany

[21] Appl. No.: 483,529

[22] Filed: Apr. 11, 1983

[30] Foreign Application Priority Data

Apr. 23, 1982 [CH] Switzerland ............... 2526/82

[51] Int. Cl.$^4$ ............................................... B03B 1/02
[52] U.S. Cl. .......................................... 209/11; 209/46; 209/49
[58] Field of Search .................. 209/49, 45, 11, 46, 209/700; 210/769, 401; 162/55, 4

[56] References Cited

U.S. PATENT DOCUMENTS

| | | | |
|---|---|---|---|
| 2,291,447 | 7/1942 | Bierbrauer | 209/49 |
| 2,468,472 | 4/1949 | Townsend | 209/49 |
| 2,583,698 | 1/1952 | Komline | 210/401 |
| 3,006,465 | 10/1961 | James | 209/45 |
| 3,070,318 | 12/1962 | Blanchard | 209/45 |
| 4,392,422 | 7/1983 | Hakansson | 210/401 |

FOREIGN PATENT DOCUMENTS 451817  3/1975  U.S.S.R. ........................ 162/55

Primary Examiner—Frank W. Lutter
Assistant Examiner—William Bond
Attorney, Agent, or Firm—Werner W. Kleeman

[57] ABSTRACT

According to the method the stock suspension is moved across a mass force field due to gravity or centrifugal acceleration in the form of stock stream or current and contacts a pick-up surface moved in conjunction with the stock stream and at substantially the same velocity. The apparatus may comprise a housing in which a turbulent or vortex flow is generated and containing a rotor therein which possesses the pick-up surface. Further embodiments have a guiding wire or screen which is moved along a pick-up cylinder or is trained around the same and upon which there is formed a layer of the stock suspension by using a stock supply device. A band, for example a wire band, may be provided to pick-up the contaminants.

10 Claims, 11 Drawing Figures

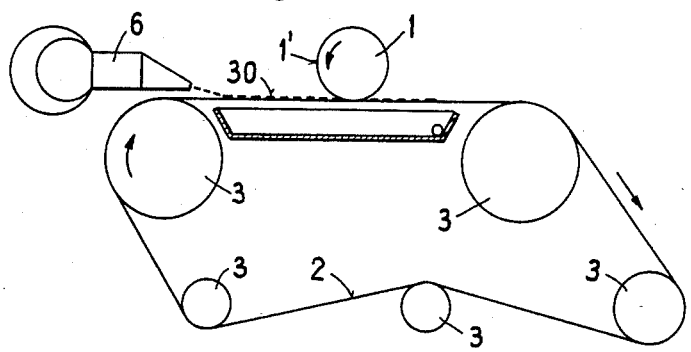
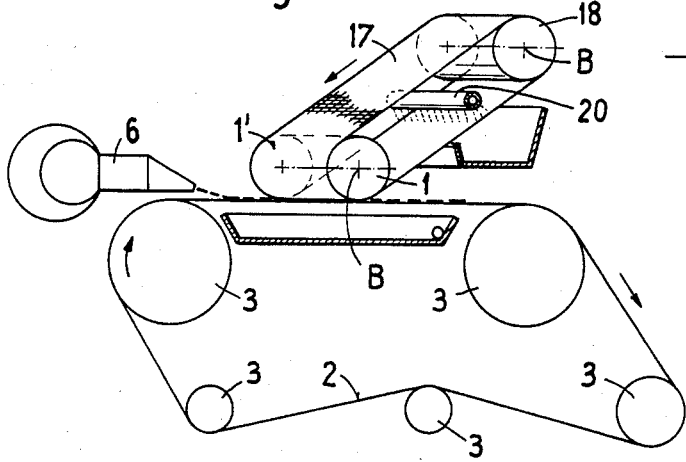
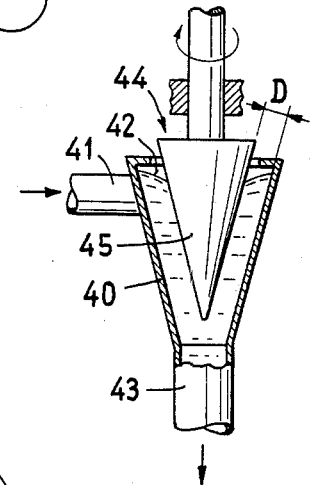
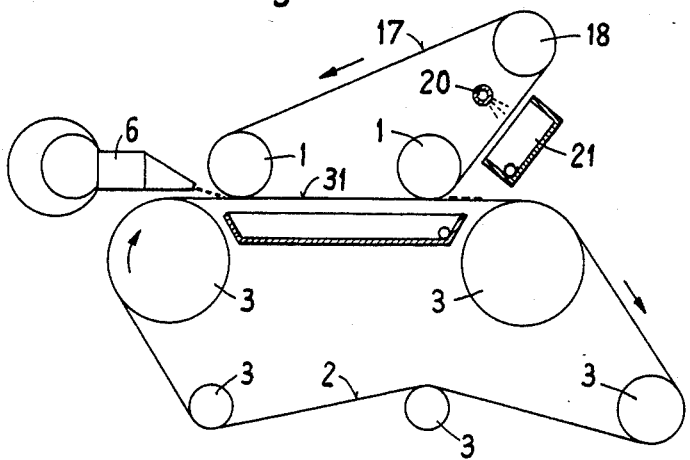

METHOD OF AND APPARATUS FOR SEPARATING TACKY CONTAMINANTS FROM A STOCK SUSPENSION

BACKGROUND OF THE INVENTION

The present invention relates to a new and improved method of, and apparatus for, separating tacky or sticky contaminants from a stock suspension. In its more particular aspects the present invention relates specifically to a new and improved method of, and apparatus for, separating tacky or sticky contaminants from a stock suspension produced from waste paper.

Tacky contaminants, so-called tackies or stickies, generally form rubber-like adhesives which are present in a stock suspension produced from waste paper and intended for fabrication of new paper. Such contaminants constitute a source of difficulties and disturbances since they adhere, for example, to the wires or screens of papermaking machines and clog the same. Heretofore it has been impossible to effectively remove such tacky contaminants from the stock suspension. It has only been found that the tacky contaminants can be partially separated by using a hydrocyclone.

SUMMARY OF THE INVENTION

Therefore, with the foregoing in mind it is a primary object of the present invention to provide a new and improved method of, and apparatus for, separating tacky contaminants from a stock suspension in a manner which enables such contaminants to be separated more effectively and more economically than heretofore possible.

Now in order to implement these and still further objects of the invention, which will become more readily apparent as the description proceeds, the method of the present development is manifested by the features that, the stock suspension is moved in or across a mass force field—meaning a force field acting upon a mass such as a gravitational field or an inertial field—in the form of a stock stream or current, and the stock suspension contacts a pick-up surface or face on the side of the stock stream or current which is located opposite to the direction of the mass forces, i.e. such stock stream contacts the pick-up surface at the side of the stock stream which confronts the origin of the force field. The pick-up surface contains a surface or face which has adhesive properties with respect to the tacky contaminants which are to be separated.

In the method according to the invention, the mass or inertia force field and the adhesion of the tacky contaminants to the receiving or pick-up surface coact with one another, and the pick-up of the contaminants is further augmented by the common movement of the stock stream and the receiving or pick-up surface which move substantially at the same velocity.

The separating action may be further enhanced by heating the stock suspension and/or the pick-up surface. Consequently, depending upon the nature of the tacky or sticky particles, the adhesion thereof to the pick-up surface can be improved.

Preferably, the pick-up surface is moved conjointly with the stock stream or current of the stock suspension.

The separating effect can furthermore also be improved by introducing free air into the stock suspension. The thus formed small air bubbles assist in removing the tacky or sticky particles.

Preferably, the stock suspension can be supplied to the pick-up surface in the form of a layer having a maximum thickness of 20 mm. Consequently, the separation and the adhering or adhesion process upon the receiving or pick-up surface are facilitated, since the particles of the tacky contaminants only have to overcome a short distance during their travel to the pick-up surface.

The receiving or pick-up surface may be provided with a surface layer formed of a material which has an affinity with respect to the tacky contaminants. The pick-up surface, however, also may have, for example, a structured surface which offers an improved adhesive or adhesion capacity or possibility to the particles of the tacky contaminants.

Moreover, as already indicated the invention also concerns an improved apparatus for practicing the method, and which apparatus is manifested by the features that, guiding or guide means are provided for forming and guiding a stream or current of the stock suspension into contact with the pick-up surface of a pick-up or receiving member containing a surface having bonding or adhesion properties with respect to the tacky contaminants to be separated.

Different embodiments are conceivable according to the principles of the apparatus described hereinbefore. Thus, for example, the apparatus may comprise a housing shaped as a body of revolution and which is suitable for forming a turbulent or vortex flow and having a rotor at the central region thereof which contains the pick-up surface. Thus, a simple and effective apparatus is realized in which the mass or inertia force field is formed by the centrifugal field of the turbulent flow, so that high accelerating forces become possible.

In a further embodiment of the apparatus according to the invention, the receiving or pick-up surface may be located on a cylinder. According to other embodiments the pick-up surface also may be located upon a receiving or pick-up band. Preferably, the pick-up band may form a wire band.

In a preferred embodiment of the apparatus according to the invention, the pick-up surface may be located on a cylinder coacting with a guiding wire or screen upon which there is located a layer of the stock suspension.

The guiding or guide wire may train about the cylinder over part of its circumference. With this construction there is also obtained a centrifugal field with high resulting inertia forces which accelerate or promote the separation process.

However, the guiding wire or screen also may extend along a straight line in the manner of a longitudinal wire, the cylinder being located above the guiding wire or screen.

In all cases in which the layer of the stock suspension is located upon a guiding wire or screen there are obtained particularly short separation paths of the particles out of the stock suspension towards the pick-up surface.

In the situations described hereinbefore the pick-up surface may be formed by a receiving or pick-up band secured to the circumference of the cylinder. Consequently, the pick-up or take-up capacity of the cylinder for the particles to be separated is increased in a most simple manner.

The receiving or pick-up surface however, also may be constituted by a receiving or pick-up band forming a loop which extends or trains around the cylinder along part of its circumference i.e., a band looping around the cylinder. As a result, the pick-up surface is increased beyond the circumferential surface of the cylinder, and additional possibilities exist for cleaning the band.

Furthermore, the pick-up band also may be guided by means of at least two guiding cylinders or rollers and may comprise a section or region extending along the guiding wire or screen and contacting the layer of the stock suspension located thereon. Such embodiment, which is likewise suitable for use in papermaking machines operating in accordance with the longitudinal wire principle, also permits enlarging the pick-up surface as compared to a single cylinder.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIGS. 8, 9 and 10 respectively depict partial sectional views of still further modifications or embodiments of the apparatus according to the invention in which a cylinder coacts with a longitudinal wire; and FIG. 11 shows a schematic partial sectional view through yet another embodiment of the apparatus according to the invention.

DETAILED DESCRIPTION OF THE PREFERRED EMBODIMENTS

Figure 1:
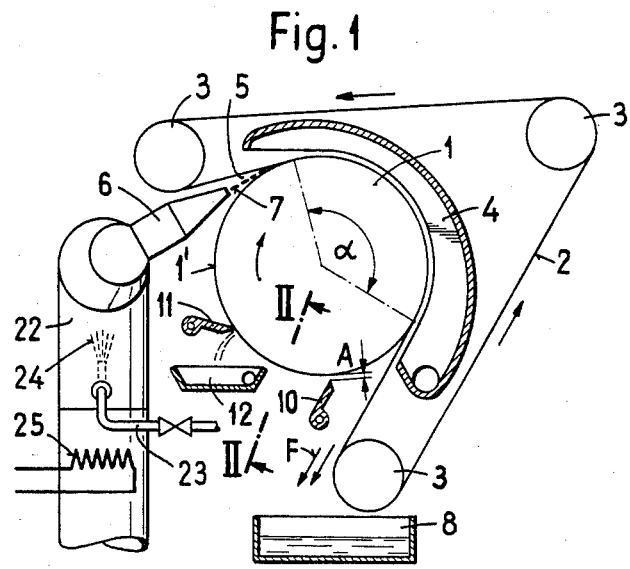
FIG. 1 is a schematic partial sectional view through a first embodiment of apparatus constructed according to the invention.

Describing now the drawings, it is to be understood that only enough of the construction of the exemplary embodiments of apparatuses have been shown as needed for those skilled in the art to readily understand the underlying principles and concepts of the present development, while simplifying the showing of the drawings. Turning attention now specifically to FIG. 1, there has been schematically illustrated therein an exemplary embodiment of apparatus comprising a cylinder 1 the outer surface of which forms a receiving or pick-up surface 1'. There is also shown a guiding or guide wire or screen 2 which extends or trains around the cylinder 1 over part of its circumference, which circumferential part is designated by angle α. The guiding or guide wire 2 is guided over guiding or guide rollers 3. A collecting vessel or catch container 4 extends along the wire-trained circumference of the cylinder 1 in order to receive water which is propelled-out of the processed stock suspension. Stock supplying means 6 are operatively associated with a substantially wedge-shaped space or region 5 formed between the guiding wire or screen 2 and the cylinder 1 and serve to introduce a thin flat jet 7 of the stock suspension to be cleaned between the cylinder 1 and the guiding wire or screen 2.

The stock supplying means 6 is provided with a supply pipe or conduit 22 into which opens an air pipe or line 23 which serves to introduce free air in the form of air bubbles 24 into the stock suspension. A heater coil 25 may be provided so that the stock suspension supplied through the supply pipe or conduit 22 may be heated.

Below the cylinder 1 there is placed a collector vessel or catch container 8 which collects the cleaned fiber material or stock F which drops thereinto from the guiding wire or screen 2. Lumps or agglomerations of fiber material which remain adhering to the cylinder 1 may be scraped off by a suitable scraper or doctor blade 10, the scraper edge of which is located at an appropriate distance A from the outer or circumferential surface of the cylinder 1. A second scraper or doctor blade 11 or equivalent structure follows the scraper 10 as seen in the direction of rotation of the cylinder 1. The scraper edge of the second scraper 11 contacts the surface of the cylinder 1 or, as the case may be, is located closer to the outer surface of the cylinder 1 than the edge of the scraper 10. The second scraper 11 serves to scrape off tacky or sticky contaminants which adhere to the outer surface of the cylinder 1. The tacky contaminants scraped off the cylinder 1 drop into a collector vessel or catch container 12.

Figure 5:
FIGS. 5, 6 and 7 represent respective partial sectional views substantially corresponding to the section line II—II in FIG. 1 and depicting different possible designs of the arrangement.

According to the showing of FIG. 5, the outer surface of the cylinder 1 may be structured. Thus, grooves 13 are illustrated in the left-hand portion of FIG. 5, these grooves 13 extending along the circumference of the cylinder 1 In the right-hand portion of FIG. 5 there have been illustrated blindhole bores 14.

During the start of the operation the grooves 13 and the blindhole bores 14 fill with the tacky or sticky material to be separated, which itself then has a special affinity with respect to the further tacky material to be separated. In this manner a layer or stratum is formed at the outer surface of the cylinder 1, the thickness of which is limited, for example, by the second scraper or doctor blade 11. Under certain conditions, however, it is possible to permit the layer to increase to a certain desired thickness without such being scraped off and then to remove the same in one operation with the apparatus at standstill.

Figure 6:

According to the showing of FIG. 6, the adhesion of the tacky contaminants to be separated to the outer surface of the cylinder 1 is enhanced by applying a layer or covering 16, formed of a material having a particularly high affinity with respect to the tacky contaminants, to the surface of the cylinder 1 which is structured by the provision of the previously described grooves 15. Such a covering material or layer 16 may be, for example, a synthetic or plastics material like polyethylene and so forth.

Figure 3:
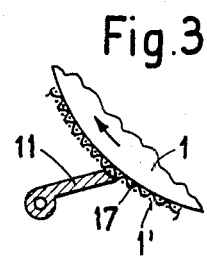
FIG. 3 shows on an enlarged scale a detail of the apparatus depicted in FIG. 1.
Figure 7:
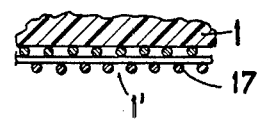

According to the showing of FIG. 7, the outer surface of the cylinder 1 is provided with a shrink-fitted wire or screen 17 which forms a desired surface structure in a most simple manner and which is particularly well suited for picking-up and retaining the tacky contaminants intended to be separated. In the embodiments shown in FIGS. 1 and 3 the wire or screen 17 is, for example, shrink-fitted to the outer surface of the cylinder 1. The mode of operation then is the same as described hereinbefore with reference to the structure shown in FIG. 5.

Figure 2:
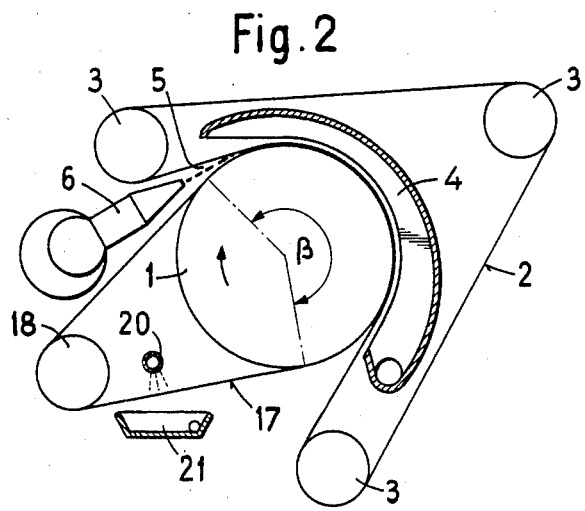
FIG. 2 is a schematic partial sectional view through a somewhat modified embodiment of the apparatus shown in FIG. 1.

In the embodiment of apparatus according to the invention which is shown in FIG. 2, the wire band 17 forms a loop or endless band which extends or trains around the cylinder 1 and a guiding or guide roller 18 along a predetermined angle, such as the angle β at the outer surface of the cylinder 1, as shown. With respect to the remaining construction, the apparatus shown in FIG. 2 corresponds to the apparatus shown in FIG. 1 and this has been conveniently indicated by generally using the same reference numerals for the same or analogous components.

In the embodiment of apparatus shown in FIG. 2, there exists the possibility of cleaning the wire or screen 17 during each revolution, which here has been indicated by the provision of a spraying nozzle 20. The material removed from the wire band or screen 17 drops into a collector vessel or catch container 21.

Figure 4:
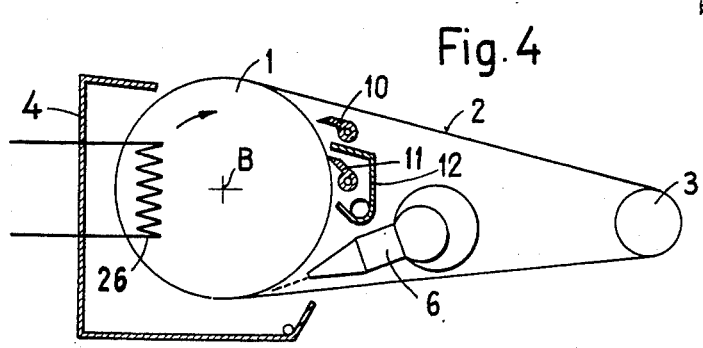
FIG. 4 is a schematic partial sectional view through a further embodiment of apparatus constructed according to the invention which operates according to the operating principles of the apparatus constructions shown in FIGS. 1 and 2.

The embodiment of apparatus shown in FIG. 4 operates according to the same principle as the apparatus constructions shown in FIGS. 1 and 2, however, is of substantially simpler design. In this case the lengthwise axis B of the cylinder 1 may extend horizontally, or even vertically, which is likewise also true for the embodiments shown in FIGS. 1 and 2 after performing some appropriate changes thereto from the constructions illustrated.

In the embodiments shown in FIGS. 2 and 4 the stock suspension supplied through the stock supplying or supply means 6 can be heated by a heater coil in a similar manner as indicated by the heater coil 25 of the arrangement of FIG. 1.

On the other hand, a heat exchange or transfer coil 26 is shown in FIG. 4 to indicate that the cylinder 1 either may be heated or cooled. It has been particularly found that in case of certain tacky contaminants it is advantageous to have the particles which have become soft due to the heating action to solidify at a cooled surface, whereby they effectively adhere to this surface.

In the modifications of the apparatus according to the invention shown in FIGS. 8 to 10, the guiding wire or screen 2 does not train around the cylinder 1, but extends along a straight line in the manner of a longitudinal or lengthwise extending wire. In each case the cylinder 1 is placed above the guiding wire or screen 2.

In the embodiment shown in FIG. 8 the outer surface of the cylinder 1 directly coacts with the layer 30 of the stock suspension located upon the guiding wire or screen 2.

In the embodiment shown in FIGS. 9 and 10 the pick-up or receiving cylinder 1 is encircled or trained by a pick-up band 17 which is guided at one (FIG. 9) or two (FIG. 10) guiding cylinders or rollers. As already mentioned the pick-up band 17 preferably may be constituted by a wire or screen. In the modification shown in FIG. 10 the band 17 comprises a section or portion 31 which extends along the guiding wire or screen 2 and contacts the layer 30 of the stock suspension located thereon.

A further embodiment of the apparatus according to the invention is illustrated in FIG. 11 and will be seen to comprise a housing 40 shaped as a body of revolution which is suitable for generating a turbulent or vortex flow. Therefore, a supply pipe or tube 41 for the liquid stock or stock suspensions is tangentially directed into the housing 40. The whirling stock suspension or vortex stock flow in the housing 40 forms a liquid level 42 and leaves the housing 40 through an outlet connection or stud 43. Within the housing 40 there is coaxially arranged a rotor 44, the outer surface 45 of which forms the pick-up surface or face. The rotor 44 rotates in the same direction and substantially at the same velocity as the vortex flow of the stock in the housing 40. The removal of the separated particles from the pick-up surface 45 of the rotor 44 occurs in such a manner that in each case the rotor 44 is withdrawn from the housing 40 and cleaned. The thickness of the layer of the stock suspension in the housing 40 is designated by reference character D in FIG. 11. The thickness of this layer is preferably not greater than 20 mm, as already mentioned. Thus, short travel paths to the pick-up surface are obtained for the particles or materials to be separated.

While the pick-up surface 45 of the rotor 44 has been described as moving at essentially the same circumferential velocity or angular velocity as the turbulent or vortex flow in the housing 40, other states of operation are conceivable in which the rotor 44 including the pick-up surface 45 is either at standstill or moves at a different velocity or speed.

It will be understood that the layer 30 is substantially thinner in the apparatus designs containing the guiding wire or screen, the thickness of the layer 30 progressively decreasing due to the dewatering thereof through the screen.

As also mentioned hereinbefore, the pick-up band 17, which has been termed a wire or screen in the embodiments described hereinbefore, does not necessarily have to be a wire band. Also, other embodiments are feasible in which the pick-up band has the form of a foil made of a suitable material like, for example, plastics. In such case the band, for example, may revolve until a layer having a predetermined thickness has formed thereon, whereafter the band is exchanged for a new one.

In the apparatus constructions depicted in FIGS. 8 and 10 the pick-up surfaces or faces 1' of the cylinder 1 or, respectively, of the pick-up band 17 advantageously run at the same speed and in the same direction as the stock streams or currents or, respectively, the layers 30 of the stock suspension, i.e., like the guide wires or screens 2. With respect to the pick-up band 17 of the apparatus construction according to FIG. 2, the two members 1 and 17 are positively conjointly moved.

A further possible arrangement of the cylinder 1 and pick-up band 17 is illustrated in FIG. 9. In this case the cylinder 1 and the roller 18 are inclined with respect to the direction of movement of the guiding wire or screen 2. Such an arrangement is also conceivable in the modifications shown in FIGS. 8 and 10.

While there are shown and described present preferred embodiments of the invention, it is to be distinctly understood that the invention is not limited thereto, but may be otherwise variously embodied and practiced within the scope of the following claims. Accordingly,

What we claim is:

1. A method of separating tacky contaminants from an aqueous stock suspension, comprising the steps of:
   establishing a mass force field to which the stock suspension is exposed;
   feeding said stock suspension in the form of a stock stream towards the mass force field;
   moving said stock suspension in the form of the stock stream across said mass force field exerting said mass forces upon the stock stream;

contacting a pick-up surface with said stock stream on a side thereof located opposite to the direction of the mass forces;

exerting the mass forces of the mass force field upon the stock suspension in a direction extending essentially radially outward of the pick-up surface;

adhering said tacky contaminants to be separated at said pick-up surface which possesses adhesion properties with respect to the tacky contaminants;

separating said pick-up surface containing thereat the adhering tacky contaminants from said stock stream; and removing the adhering tacky contaminants from the pick-up surface.

2. The method as defined in claim 1, further including the step of:

heating said stock suspension.

3. The method as defined in claim 1, further including the step of:

heating said pick-up surface.

4. The method as defined in claim 1, further including the step of:

moving the pick-up surface a in common direction with the stock stream of the stock suspension.

5. The method as defined in claim 1, further including the step of:

introducing free air into said stock suspension.

6. The method as defined in claim 1, further including the step of:

supplying said stock suspension to said pick-up surface to form a layer having a maximum thickness of 20 mm.

7. The method as defined in claim 1, further including the step of:

providing said pick-up surface with a surface layer of a material having an affinity with respect to said tacky contaminants.

8. The method as defined in claim 1, further including the step of:

providing a structured surface on said pick-up surface.

9. The method as defined in claim 1, wherein:

the stock stream is contacted by the pick-up surface at a side of the stock stream which confronts a location of origin of the mass force field.

10. A method of separating tacky contaminants from an aqueous stock suspension, comprising the steps of:

establishing a mass force field to which the stock suspension is exposed;

feeding said stock suspension in the form of a stock stream towards the mass force field;

moving said stock suspension in the form of the stock stream across said mass force field exerting said mass forces upon the stock stream;

contacting a pick-up surface with said stock stream on a side thereof located opposite to the direction of the mass forces;

exerting the mass forces of the mass force field upon the stock suspension in a direction extending essentially radially outward of the pick-up surface;

adhering said tacky contaminants to be separated at said pick-up surface which possesses adhesion properties with respect to the tacky contaminants;

separating said pick-up surface containing thereat the adhering tacky contaminants from said stock stream; and discarding the pick-up surface containing thereat the adhering tacky contaminants.

* * * * *